June 5, 1951 — A. B. NEWTON — 2,555,990
TEMPERATURE CONTROL SYSTEM
Filed July 25, 1947 — 2 Sheets-Sheet 1
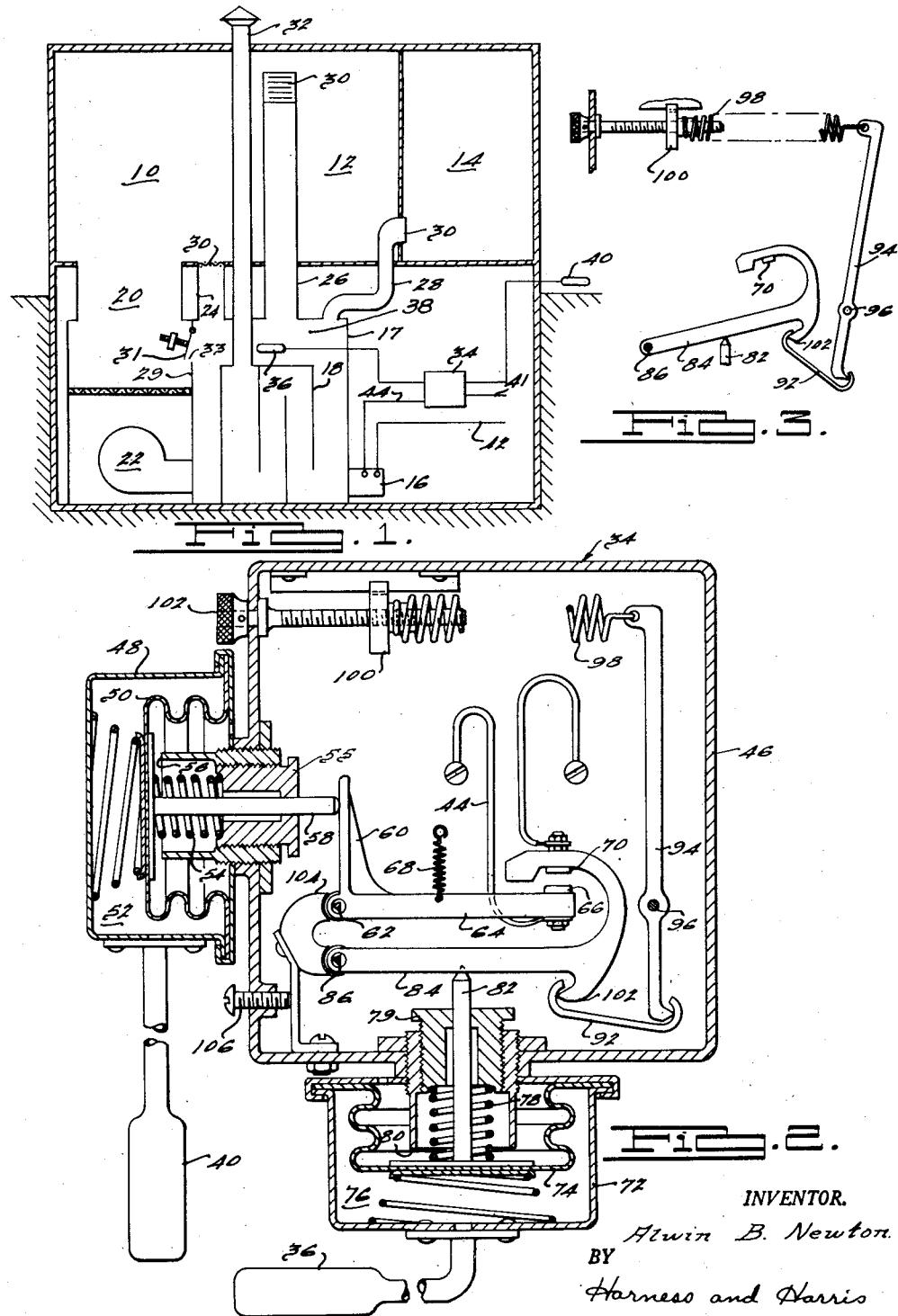
INVENTOR.
Alwin B. Newton
BY
Harness and Harris
ATTORNEYS.

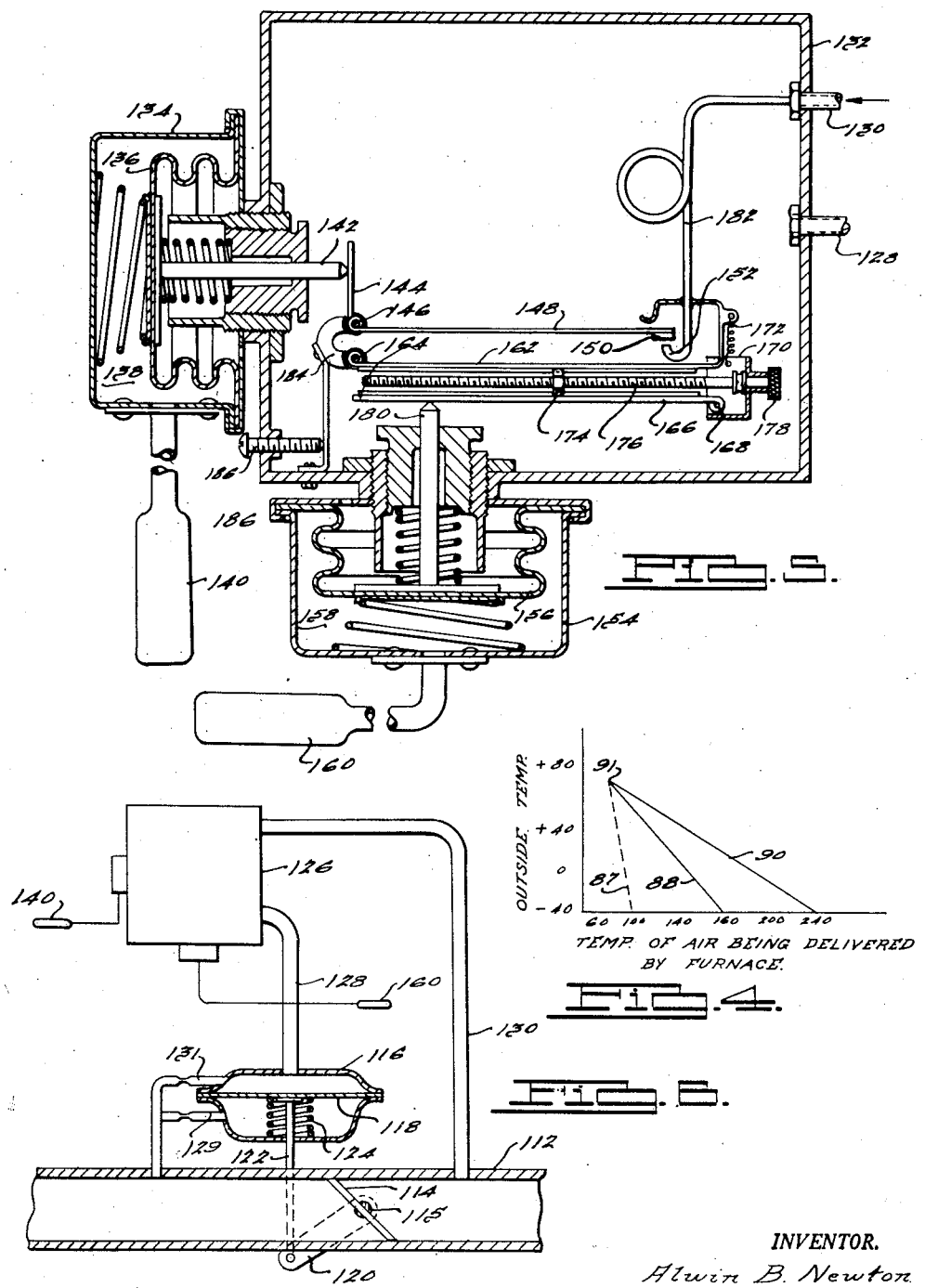

Patented June 5, 1951

2,555,990

UNITED STATES PATENT OFFICE 2,555,990

TEMPERATURE CONTROL SYSTEM

Alwin B. Newton, Dayton, Ohio, assignor to Chrysler Corporation, Highland Park, Mich., a corporation of Delaware Application July 25, 1947, Serial No. 763,596

2 Claims. (Cl. 236—91)

This invention relates to a control means adapted for use in conjunction with an air conditioning system.

It is an object of this invention to provide a means to control the operation of the burner of a heating system or compressor of a cooling system in response to the temperature of conditioned air being delivered by the system and in response to the temperature of the outside air.

It is a further object of the invention to alter the supply air temperature as outside temperature decreases.

It is an additional object of the invention to provide adjustable means for selecting the rate of response of the control to changes in temperature. This selection permits the proper operating temperatures to be selected for each installation. The insulation and other factors vary in different buildings and therefore the optimum relation between the temperature of supply air and outside air may be different for different buildings.

Individually controlled outlet grilles employing a bellows and a temperature responsive expansible medium to activate the bellows are well known in the art and have been provided for each room of a building. These grilles may be made to operate over a relatively large temperature differential, for example, as great as 8 degrees Fahrenheit, to operate the grille between its limits of a fully opened position and a fully closed position. It is an object of this invention to provide a control which can utilize this feature of these grilles to improve the comfort results as the outdoor temperature changes.

It is also an object of this invention to provide in this control means to adapt the control to use in conjunction with individually controlled grilles having a relatively small temperature differential between open and closed positions. Grilles of this latter type are described in my copending application, Serial No. 720,081 filed January 3, 1947, now Patent No. 2,533,175, issued December 5, 1950.

It is also an object of this invention to provide a control adapted for use in combination with individually controlled grille outlets to rooms and adapted to provide an air supply temperature which has an inverse relation to outside temperature. Because of heat radiation from cold walls and other factors human comfort requires a warmer room temperature in cold weather than in warm weather. By increasing the air supply temperature in cold weather more than the amount required to maintain a constant room temperature, the room temperature increases slightly causing the individual grille to partially close. The partially closed grille in its new position is static at the higher room temperature which produced this position. Thus the room temperature has been stabilized at a higher value and deviation from this value rather than from the original room temperature will be required to alter the grille position to adjust the room temperature.

Although the control means to be described herein is equally applicable to a heating or a cooling system the description and drawings herein show the device in combination with a heating system which is a typical application of the device. The invention is not, however, so limited. In addition, although the control has been shown as a means for controlling the delivery of heated air the control may be utilized to control the delivery of other heating mediums either fluid or vapor, as for example, water or steam.

In the drawings:

Fig. 1 is a diagrammatic view of a heating system;

Fig. 2 is a plan view of the control;

Fig. 3 is a view of a portion of the control showing the levers therein in a different position;

Fig. 4 is a graph showing the relation of the temperature of air being delivered by a furnace to the temperature of outside air;

Fig. 5 is a horizontal section of a modified form of control adapted to regulate the flow of a gaseous fuel to a burner;

Fig. 6 is a diagrammatic view of a system incorporating the control illustrated in Fig. 5.

In Fig. 1, a central heating system is illustrated which is adapted to heat a plurality of rooms. Rooms 10, 12 and 14 are illustrated. The heating system includes a burner 16, a furnace 17 having a heat exchange portion 18, an inlet 20 for air, a fan 22 adapted to blow this air into contact with the heat exchange portion 18, and ducts 24, 26 and 28 leading to the rooms 10, 12, and 14 respectively. A grille 30 is provided in each room in operative relation with the end of the duct associated with that room. A stack 32 is provided for the discharge of gases from the furnace. The stack 32 is connected with the heat exchange portion 18.

A control 34 is operatively associated with the burner 16. The control illustrated incorporates means to make an electrical contact under selected conditions. The control, if desired, may regulate the flow of a fuel such as gas rather than the flow of electricity. The burner is adapted to be turned on or to have its fuel supply increased when the electrical contact is made and turned off or have its fuel supply decreased when the electrical contact is broken. It is common practice to so control a burner and for this reason a detailed description thereof will be omitted. The control 34 is provided with a bulb 36 which in the drawing is positioned in the plenum chamber 38 of the furnace and subjected to the heat of the air which has been heated by the furnace. The bulb may, if desired, be placed at other locations where it is exposed to the air heated by the furnace. The control 34 is also provided with a bulb 40 which is positioned outside of the building and exposed to the atmosphere. Electrical lines 41, 42 and 44 have been diagrammatically shown to illustrate the electrical relation between control 34 and burner 16.

Referring to Fig. 2 the construction of the control 34 is illustrated. The control 34 is assembled in a housing 46. A dome 48 is secured to a side wall of the housing. A pressure responsive bellows 50 is positioned within the dome 48 and cooperates therewith to form a gas tight compartment 52. The bulb 40 is connected to the compartment 52 and the compartment 52 and bulb 40 are filled with an expansible medium so that temperature changes will cause the medium in the bulb 40 to activate the bellows 50. A spring 54 resists compression of the bellows and a stop 56 is provided to limit the compression of the bellows. A nut 55 adjusts the compression of spring 54 and thereby shifts the point 91, hereinafter referred to, horizontally on the graph of Fig. 4. A rod 58 is secured to the bellows and adapted to be moved axially by compression or expansion of the bellows. An L-shaped lever 60 is pivoted at 62 and has one leg thereof adapted to be engaged by the rod 58. Movement of the rod 58 rotates the lever 60 about the pivot 62. The other leg 64 of the lever 60 is provided with a terminal 66 adjacent the end thereof which is insulated therefrom and has the electrical wire 44 secured thereto. A spring 68 urges the lever 60 into engagement with the rod 58. Terminal 66 is positioned in a predetermined position for each outside temperature by the apparatus described.

A similar mechanism is provided to control the positioning of a second terminal 70. A dome 72 is associated with the housing 46 and contains a bellows element 74 which cooperates with the dome 72 to provide a gas tight compartment 76. The compartment 76 is connected to the bulb 36 and the bellows element 74 is thus activated by expansion and contraction of the medium provided in the compartment 76 and bulb 36. A spring 78 resists movement of the bellows. A stop 80 limits movement of the bellows. A nut 79 adjusts the compression of spring 78 and thereby shifts the point 91, hereinafter referred to, vertically on the graph of Fig. 4. A rod 82 is operatively connected to the bellows and adapted to be moved in response to contraction and expansion of the bellows element 74. A lever 84 pivoted at 86 carries the terminal 70 which is insulated therefrom. Means are thus provided to position the terminal 70 in predetermined position for each temperature in the plenum chamber of the furnace. The actuation of the burner is dependent therefore upon both outside temperature conditions and the temperature of the air in the plenum chamber 38 of the furnace.

Fig. 4 is a graph illustrating the relationship between the temperature in the plenum chamber 38 and the outside temperature. It is common practice to provide a higher temperature in the plenum chamber of a furnace as the outside temperature decreases. This is necessary to sustain a predetermined temperature in a room. The line 88 illustrates this relationship on the graph of Fig. 4 which plots temperature of air being delivered by the furnace against the outside temperature.

It has been found that it is often insufficient to maintain the same predetermined temperature in a room for all outside temperature conditions. Human comfort demands that the room temperature increase as the outside temperature drops. The requirement for additional temperature to maintain a uniform standard of human comfort is occasioned by factors such as radiation from cold walls. Means are provided herein to effect this result and increase the room temperature in response to drops in outside temperature. This is reflected by a change in the slope of the line in the graph of Fig. 4. The line 88 plotted on the graph in Fig. 4 shows the amount that the temperature of air in the plenum chamber 38 of the furnace must be increased as the outside temperature drops to maintain a constant room temperature at a fixed grille position and the line 90 shows the manner in which the plenum chamber temperature may be increased an additional increment as the outside temperature drops so that the room temperature will actually be increased.

A means is provided which is adapted to resist movement of the terminal 70 as the temperature of air in the plenum chamber increases in response to decrease in outside temperature. The movement of the terminal 70 for a given increment of temperature change may be adjusted by means consisting of a link 92, a lever 94 pivotally mounted in the housing 46 at 96 and a spring 98 which is operatively connected at one end to the lever 94 and at its opposite end to an adjusting mechanism 100 secured to the housing 46. The link 92 is provided with end portions which are curved upwardly and toward each other. The lever 84 is provided with an extension 102 which engages one of the end portions of the link 92. The lever 94 has one end portion in engagement with the other end portion of the link 92.

Fig. 2 illustrates the relative positions of the lever 84, link 92 and lever 94 at a particular temperature illustrated on the graph in Fig. 4 as point 91 where the lines 87, 88 and 90 intersect. Fig. 3 illustrates a position of lever 84, link 92 and lever 94 when a relatively high temperature exists in the plenum chamber 38. The movement of the terminal 70 in response to a given change of pressure of the medium in bulb 36 is retarded by spring 98 in increasing amounts as lever 84 moves from the position shown in Fig. 2 to that shown in Fig. 3. The degree to which movement of terminal 70 is retarded at any given position may be predetermined by adjustment of the tension on spring 98. Thus the locus of conditions under which the contacts will close may be established as line 88, or line 90, or a variant thereof. This action is shown on Fig. 4 by the fact that the offset between lines 88 and 90 is very small at the lower plenum chamber temperatures. Spring 98 offers little resistance to the movement of lever 84 from its Fig. 2 position due to the fact that the link 92 is in alignment with the points 102 and 86 of lever 84. However as the deflection of the lever 84 increases the angle between a line connecting points 86 and 102 and link 92 increases and the moment arm by reason of which spring 98 assists spring 78 in opposing movement of rod 82 is increased in a substantially linear manner. In the illustration of Fig. 3 the force imparted to the linkage by spring 98 tends to straighten the links 92 and 84 into alignment. Movement of the bellows element 74 must overcome this force which increases as the distortion of the bellows increases.

The line 87 plots the relation of the temperatures when the spring 98 is adjusted to zero tension. The movement of the lever 84 from the position shown in Fig. 2 is unresisted by the spring 98.

Means are provided in the control 34 to select the slope of the line in Fig. 4. Adjustment of spring 98 will determine the slope of the line in Fig. 4. Line 87 therein shows the relation between outside temperature and the temperature of supply air delivered by the furnace when there is no tension in spring 98. Line 88 shows the relation between outside temperature and supply air necessary to maintain a constant room temperature for a given grille opening. Line 90 shows the relation when the spring 98 has been tensioned sufficiently to produce an additional increment of supply air temperature for given outside temperatures. Mechanical adjustment 100 and its manual control 102 provide the means for preselecting the desired tension of spring 98.

Mechanical adjustment 100 and its manual control 102 provide a means for the preselection of the desired tension of the spring 98. The control may be adapted to operate at its optimum efficiency in each installation. The insulation, air quantity etc. varies in different buildings and the optimum relation between the temperature of air delivered by the furnace and the outside air may be different for different buildings. That is, if the building has poor insulation the required temperature in the plenum chamber for a given outside temperature would have to be great.

A permanent magnet 104 is provided to impart magnetic lines of force to the link 60 and the link 84. This magnetic force tends to hold terminals 66 and 70 in contact so that they are separated with a snap and are brought together with a snap. Arcing over a small gap is thus prevented. An adjustment 106 is provided on the magnet. The adjustment comprises a threaded element which penetrates the housing 46 and is adapted to vary the relation of the magnet to the ends of the levers 60 and 84 to thereby vary the air gap between the magnet and the levers and vary the amount of magnetism used to effect the snap action of the terminals.

Different expansible mediums may be selected for bulbs 40 and 36 so that the relationship between inside and outside temperatures may be substantially linear as shown in Fig. 4 over a wide range of temperature level.

This control system has been described as adapted for use in combination with the individually controlled outlets in rooms as described in my copending application, Serial No. 720,081 which are adapted to maintain a constant room temperature. By delivering heated air that is at a temperature higher than is required to maintain the constant room temperature the latter grille partially closes to reduce the amount of hot air delivered to the room thus slightly increasing the temperature corresponding to a static position of the grille. The sensitivity of the system is thus increased and the room temperature will not fluctuate over the entire 8° range referred to above. The combination of grille and control provides a constant room temperature for a given outside temperature while the individual grilles adapt the system to the requirements of individual rooms.

Referring to Fig. 1 an additional feature of the control system is illustrated. A partition 29 separates air inlet 20 from furnace 17. A damper 31 is hinged to this partition and adapted to cover an opening 33 in the partition 29. The damper 31 is hinged so that air may not enter furnace 17 through opening 33 but air from the plenum chamber 38 when under a sufficient pressure may mix with the air in inlet 20 and be recirculated. When the grilles 30 partially close the pressure of air in plenum chamber 38 builds up and damper 31 opens and heated air from the plenum chamber is recirculated through the fan 22. The fact that some of the air being supplied to the furnace is thus preheated lowers the requirement for heat from the burner 16. Bulb 36 which is located in the plenum chamber controls the operation of the burner and therefore the recirculation of air is able to effect a reduction in the output required of burner 16. The proportion of bypassed air in the supply air determines the amount of burner operation required. It should be noted that the desired plenum chamber temperature is established by the bulb 40 so that the outside temperature dictates the necessary plenum chamber temperature.

Fig. 6 illustrates a modified system wherein a control is adapted to regulate the flow of gaseous fuel to the burner of a furnace. In Fig. 6 a burner (not shown) is operatively connected to a supply pipe 112 having a valve 114 pivotally mounted therein on a shaft 115. A case 116 is provided with a diaphragm 118. A lever 120 is keyed to shaft 115. A rod 122 is operatively connected to diaphragm 118 and lever 120. A spring 124 yieldably resists deformation of diaphragm 118. Case 116 is sealed and connected to a control 126 by a pipe 128. A pipe 130 connects control 126 to supply pipe 112 upstream of the valve 114. A line 131 containing a metering orifice connects the portion of case 116 which is above the diaphragm 118 to pipe 112 at a point downstream from valve 114. A line 129 containing a metering orifice connects the portion of case 116 which is below diaphragm 118 to pipe 112 at a point downstream from valve 114.

In Fig. 5 the control 126 is illustrated in detail. The control 126 is contained in a gas tight housing 132. A dome 134 is secured to a side wall of the housing. A pressure responsive bellows 136 is positioned within the dome 134 and cooperates therewith to form a gas tight compartment 138. A bulb 140 is connected to compartment 138 and the compartment 138 and bulb 140 are filled with an expansible medium so that temperature changes will cause the medium in the bulb 140 to activate the bellows 136. The bulb 140 is positioned outside the building and exposed to the atmosphere in the same manner as the bulb 40 which was described with reference to Fig. 1 and 2. A rod 142 is secured to the bellows. An L-shaped lever 144 is pivoted at 146 and has one leg thereof adapted to be engaged by the rod 142. Movement of the rod 142 rotates the lever 144 about the pivot 146. The other leg 148 of the lever 144 has a valve element 150 in the form of a pad secured to the end thereof. Valve element 150 is positioned in a predetermined position for each outside temperature by the apparatus described.

A similar mechanism is provided to control the positioning of a second valve element 152. A dome 154 is associated with the housing 132 and contains a bellows element 156 which cooperates with the dome 154 to provide a gas tight compartment 158. The compartment 158 is connected to a bulb 160 and the bellows 156 is activated by expansion and contraction of a medium provided in the compartment 158 and bulb 160. Bulb 160 is positioned in the plenum chamber of the furnace in the same manner as bulb 36 which was described with reference to Figs. 1 and 2. A lever 162 is pivoted on the housing 132 at 164. A lever 166 is pivoted on the housing 132 at 168. A plate member 170 is also pivoted at 168. A spring 172 connects lever 162 and plate member 170 so that lever 162 is urged in a counterclockwise direction. A threaded element 174 is positioned between levers 162 and 166 and in engagement with these levers. The threaded element 174 is threaded upon an adjusting rod 176 carried by the plate 170. A knob 178 is provided on rod 176 for manual adjustment thereof. A rod 180 is operatively connected to the bellows 156 and adapted to engage the lever 166 in response to contraction and expansion of the bellows 156. Means are thus provided to position the valve element 152 in a predetermined position for each temperature in the plenum chamber of the furnace. The valve element 152 is connected by a flexible tube 182 to the pipe 130. It will thus be seen that the valve element 150 when properly positioned can close the tube 182 so that gas cannot be emitted therefrom. When valve element 150 is positioned away from valve element 152 so that gas may escape from pipe 130 and tube 182 the housing 132 is filled with gas which enters case 116 by means of pipe 128. The gas pressure within the housing 132 is transmitted to the case 116 and controls the position of the diaphragm 118. When a relatively large gas pressure exists in control 126 and case 116 the diaphram 118 is moved downward against the reaction of spring 124 and the valve 114 is opened so that gas may flow through supply pipe 112. The gas pressure above diaphram 118 is dependent upon the rate of escape of gas through bleed line 131. The rate of flow of gas from tube 182 is dependent upon the position of valve element 150 relative to the valve element 152. The position of valve 114 is thus dependent upon the relative positions of valve elements 152 and 150. A modulating control of the supply of gaseous fuel to a burner is thus provided. When the valve 114 has been opened and the temperature responsive bulbs 140 and 160 effect an operation of the control apparatus so that tube 182 is closed by valve element 150 the gas in housing 132 and case 116 is bled off by line 128, 192 and 131 and the spring 124 is able to return the diaphragm to its upper position thereby closing valve 114. The supply of fuel to the burner is thus dependent upon both outside temperature conditions and the temperature of the air in the plenum chamber of the furnace which are measured by the bulbs 140 and 160 respectively.

Means are provided in the control 126 to select the slope of the line in Fig. 4. Adjustment of the threaded rod 176 and the threaded element 174 will change the effective lever arms which will transmit motion from rod 180 to the lever 162. This will determine the slope of the line in Fig. 4. This adjustment is similar to the adjustment of spring 98 described with reference to Fig. 2. A permanent magnet 184 may be provided for the same purpose that was described with reference to magnet 104 in Fig. 2 if desired. Adjustment of screw 186 which positions magnet 184, effects the amount of change in temperature at bulbs 36 or 40 which produces a given change in position of valve 114 in Fig. 6. Further adjustment of screw 186 will cause the valve elements 150 and 152 to operate in a snap-acting manner to give on-off control.

It is preferred that the control illustrated in Fig. 2 be associated with a vapor type fill in bulbs 36 and 40 and their associated components. It is also preferred a liquid type fill be used in bulbs 140 and 160 of the Fig. 5 apparatus. The lever systems illustrated are particularly adapted for use with these types of fill although they could be interchanged if desired.

I claim:

1. A control apparatus adapted to regulate the operation of a system adapted to deliver a heated medium, said apparatus comprising a first pivoted lever, a second pivoted lever, means associated with said levers and adapted to regulate said system in response to the relative positions of said levers, a first temperature responsive means adapted to rotate said first lever in response to changes in outside temperature, a second temperature responsive means adapted to rotate said second lever in response to changes in temperature of the medium delivered by said system, and means to increase the resistance of said second lever to rotation as the temperature of the delivered medium increases, said last mentioned means comprising a third pivoted lever having one portion adapted to travel in an arcuate path, a link connecting said portion of said third lever and said second lever and adapted in one position to extend tangentially to said path and to transmit motion with an increased component tending to rotate said third lever as the rotation of said second lever increases and a spring opposing rotation of said third lever.

2. A control apparatus adapted to regulate the operation of a system adapted to deliver a heated medium, said apparatus comprising a first pivoted lever, a second pivoted lever, means associated with said levers and adapted to regulate said system in response to the relative positions of said levers, a first temperature responsive means adapted to rotate said first lever in response to changes in outside temperature, a second temperature responsive means adapted to rotate said second lever in response to changes in temperature of the medium delivered by said system, and means to increase the resistance of said second lever to rotation as the temperature of the delivered medium increases, said last mentioned means comprising a third pivoted lever having one portion adapted to travel in an arcuate path, a link connecting said portion of said third lever and said second lever and adapted in one position to extend tangentially to said path and to transmit motion with an increased component tending to rotate said third lever as the rotation of said second lever increases, a spring opposing rotation of said third lever and manually adjustable means for regulating the loading of said spring to thereby control the amount of motion transmitted to said second terminal by said spring opposed means.

ALWIN B. NEWTON.

(References on following page)

REFERENCES CITED

The following references are of record in the file of this patent:

UNITED STATES PATENTS

| Number | Name | Date |
|---|---|---|
| 2,063,613 | McCarthy | Dec. 8, 1936 |
| 2,177,597 | Haines | Oct. 24, 1939 |
| 2,234,633 | Hoppe | Mar. 11, 1941 |
| 2,404,597 | McClain | July 23, 1946 |
| 2,440,052 | Lingen et al. | Apr. 20, 1948 |

FOREIGN PATENTS

| Number | Country | Date |
|---|---|---|
| 318,699 | Great Britain | Sept. 12, 1929 |
| 772,727 | France | Aug. 20, 1934 |
| 791,251 | France | Sept. 23, 1935 |